US006799061B2

(12) United States Patent
Jeoung

(10) Patent No.: US 6,799,061 B2
(45) Date of Patent: Sep. 28, 2004

(54) METHOD OF DEFINING SHORT KEYS USED TO SELECT DESIRED FUNCTIONS OF A COMMUNICATION TERMINAL BY THE USER

(75) Inventor: Mi-Ran Jeoung, Seoul (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 532 days.

(21) Appl. No.: 09/731,611

(22) Filed: Dec. 7, 2000

(65) Prior Publication Data

US 2001/0003097 A1 Jun. 7, 2001

(30) Foreign Application Priority Data

Dec. 7, 1999 (KR) .......................................... 1999-55361

(51) Int. Cl.[7] .............................. H04B 1/38; H04M 1/00
(52) U.S. Cl. ................. 455/566; 455/412.1; 455/550.1; 455/575.1; 455/418
(58) Field of Search .............................. 455/550.1, 566, 455/575.1, 90, 412.1, 418

(56) References Cited

U.S. PATENT DOCUMENTS

| | | | |
|---|---|---|---|
| 5,758,295 A | | 5/1998 | Ahlberg et al. ............. 455/466 |
| 5,761,610 A | * | 6/1998 | Sorensen et al. ........... 455/558 |
| 5,784,009 A | | 7/1998 | Wada et al. .................. 341/23 |
| 5,894,276 A | | 4/1999 | Altidor et al. ......... 340/825.22 |
| 6,122,530 A | * | 9/2000 | Overy et al. ................. 455/566 |
| 6,125,287 A | * | 9/2000 | Cushman et al. ........... 455/566 |
| 6,381,468 B1 | * | 4/2002 | Larsen et al. ............ 455/550.1 |
| 6,381,474 B1 | * | 4/2002 | Kraft .......................... 455/566 |
| 6,415,164 B1 | * | 7/2002 | Blanchard et al. .......... 455/566 |
| 6,463,304 B2 | * | 10/2002 | Smethers ..................... 455/566 |
| 6,487,424 B1 | * | 11/2002 | Kraft et al. ................. 455/566 |

FOREIGN PATENT DOCUMENTS

WO     WO 97/31467      8/1997   ............ H04M/1/00

OTHER PUBLICATIONS

"Personalized Fast Access to Functions on a Mobile Telephone", Research Disclosure, Kenneth Mason Publication, Hampshire, GB, No. 426, Oct. 1999.

"User Interface Shortcut", IBM Technical Disclosure Bulletin, vol. 33, No. 3A, Aug. 1, 1990 pp. 413–414.

* cited by examiner

Primary Examiner—Simon Nguyen
(74) Attorney, Agent, or Firm—Cha & Reiter, L.L.C.

(57) ABSTRACT

A method of defining the hot keys used to immediately initiate desired functions by the user in a communication terminal, comprises the steps of displaying a plurality of main menu items in the hot key defining mode, displaying a plurality of sub-menu items corresponding to a particular main menu item selected by the user, selecting at least one of the sub-menu items by the user, displaying the keys used for the hot keys, and selecting one of the key as a hot key assigned to the at least one sub-menu.

9 Claims, 6 Drawing Sheets

METHOD OF DEFINING SHORT KEYS USED TO SELECT DESIRED FUNCTIONS OF A COMMUNICATION TERMINAL BY THE USER

CLAIM OF PRIORITY

This application makes reference to and claims all benefits accruing under 35 U.S.C. Section 119 from an application entitled "METHOD OF DEFINING SHORT KEYS USED TO SELECT DESIRED FUNCTIONS OF A COMMUNICATION TERMINAL BY THE SER" filed in the Korean Industrial Property Office on Dec. 7, 1999 and there duly assigned Ser. No. 99-55361.

BACKGROUND OF THE INVENTION

1. Field of the Invention

The present invention relates to a communication terminal, such as a mobile phone. More particularly, the present invention relates to a method of defining short keys used to select desired functions of the communication terminal.

2. Description of the Related Art

A communication terminal usually includes a keypad, which consist of a plurality of alphanumeric keys and functional keys used to operate the terminal, and a display unit for displaying its operational state. For example, upon pressing a specific functional key to select a particular function, the display device displays an operational menu representing various functions for the user to select on the LCD screen. A common term, a short/hot key, is used when a user wishes to activate a particular key to cause the communication terminal to immediately perform a desired function or display desired menu items.

In a conventional mobile station, various hot keys are predefined by "*", "#", and navigation keys (up, down, left, and right keys) to initiate the respective desired functions. For example, a choice of alarm signal used to notify an incoming call may be selected between the normal ring mode or vibration mode by pressing a specific hot key predefined for that function. Accordingly, a mobile user may only use these types of hot keys to predefine most of their desired functions in the mobile terminal.

SUMMARY OF THE INVENTION

It is an object of the present invention to provide a method of defining a plurality of hot keys used to immediately initiate specific functions desired by the user in a communication terminal.

According to the present invention, a method of defining the hot keys used to immediately initiate the desired functions by the user in a communication terminal, comprises the steps of: displaying a plurality of main menu items in the hot key defining mode, displaying a plurality of sub-menu items corresponding to a particular main menu item selected by the user, selecting at least one of the sub-menu items by the user, displaying the keys used for the hot keys, and selecting one of the key as the hot key assigned to the at least one sub-menu.

BRIEF DESCRIPTION OF THE ATTACHED DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE PREFERRED EMBODIMENT

In the following description, for purposes of explanation rather than limitation, specific details are set forth such as particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

Figure 1:
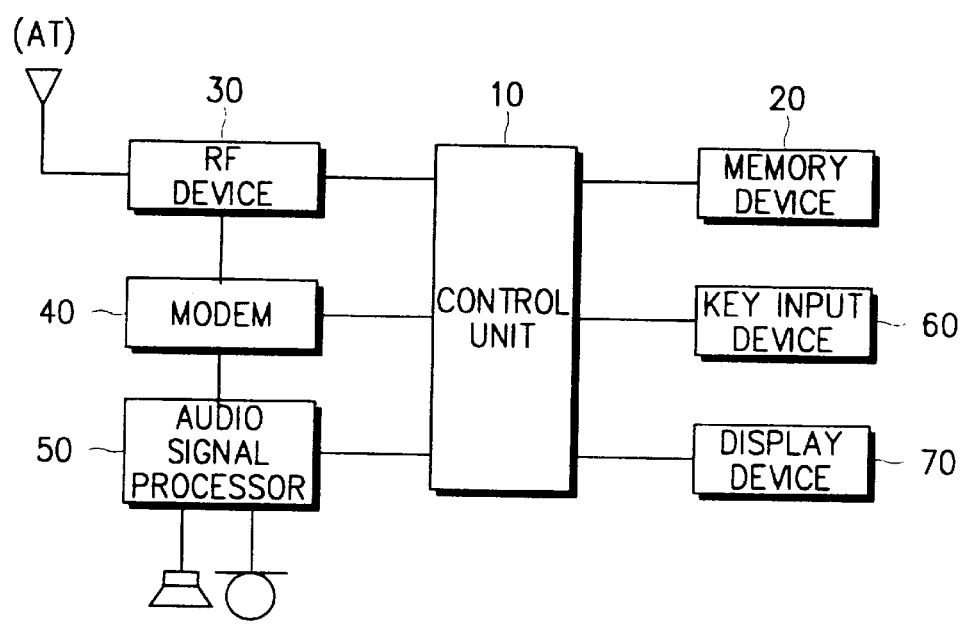
FIG. 1 is a block diagram for illustrating the structure of a mobile station.

With reference to FIG. 1, a control unit 10 controls the whole functions of a mobile station including the process of defining hot keys by the user. A memory device 20 comprises an ROM for storing a control program to control the operation of the mobile station and an RAM for temporarily storing data generated upon executing the control program. The program data required for defining the hot keys is stored into the memory device.

A radio frequency (RF) device 30 converts analog base band signals into the corresponding RF signals to be transmitted to a base station through a radio channel, or down-converts the RF signals received through an antenna AT into the corresponding analog base band signals via a modem 40, which modulates digital data into analog base band signals via the RF device 30 or de modulates analog signals received from the RF device into digital data via an audio signal processor 50.

The audio signal processor 50 converts the analog audio signals inputted through a microphone (MIC) into the corresponding digital data (ADPCM) and transferred to the modem, or the digital audio signals from the modem 40 into the analog audio signals and outputted through a speaker (SP).

A key input device 60 includes a plurality of alphanumeric keys and navigation keys (up, down, left, and right keys) to generate the key data delivered to the control unit 10. The navigation keys are used as the hot keys that are predefined by the user to initiate desired functions according to the present invention. A display device 70 displays the operational state of the mobile phone on an LCD screen under the control of the control unit 10.

Figure 2:
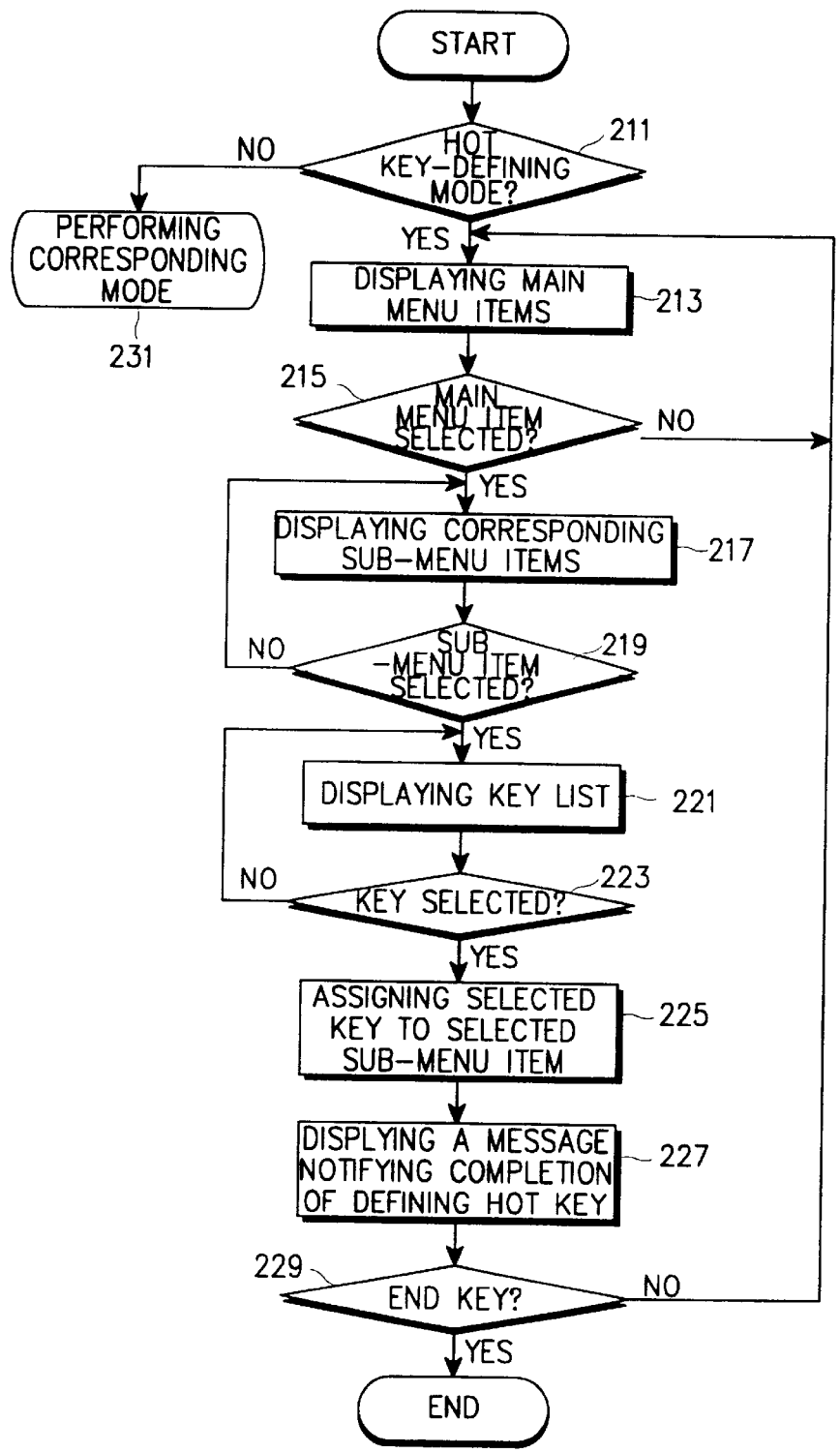
FIG. 2 is a flow chart for illustrating the process of defining hot keys by the user in a mobile station according to the present invention.

FIG. 2 describes the process of defining the hot keys according to the user. The control unit 10 determines in step 211 whether the user selects the hot key-defining mode. If such a mode is selected, the control unit 10 proceeds to step 213, otherwise proceeds to step 231 to perform corresponding function.

Figure 3A:
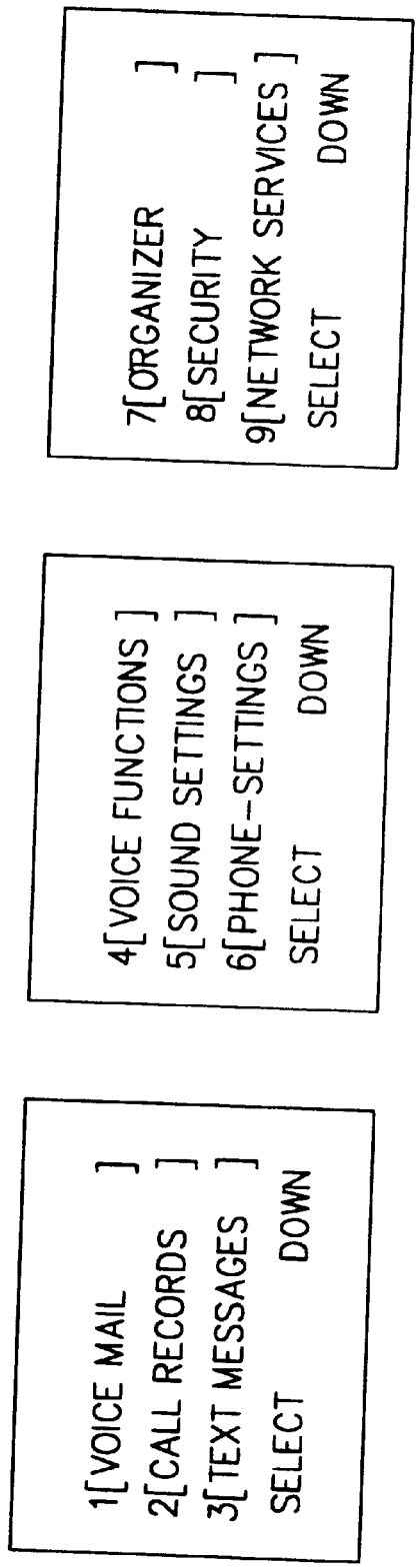
FIGS. 3A and 3B illustrate the display screen of a mobile phone displaying the menu items.

In step 213, the control unit 10 displays the main menu items as shown in FIG. 3A, where nine main menu items are depicted. If the user selects one of the main menu items in step 215, the control unit 10 proceeds to step 217, or otherwise return to step 213 to keep on displaying the main menu items.

Figure 3B:
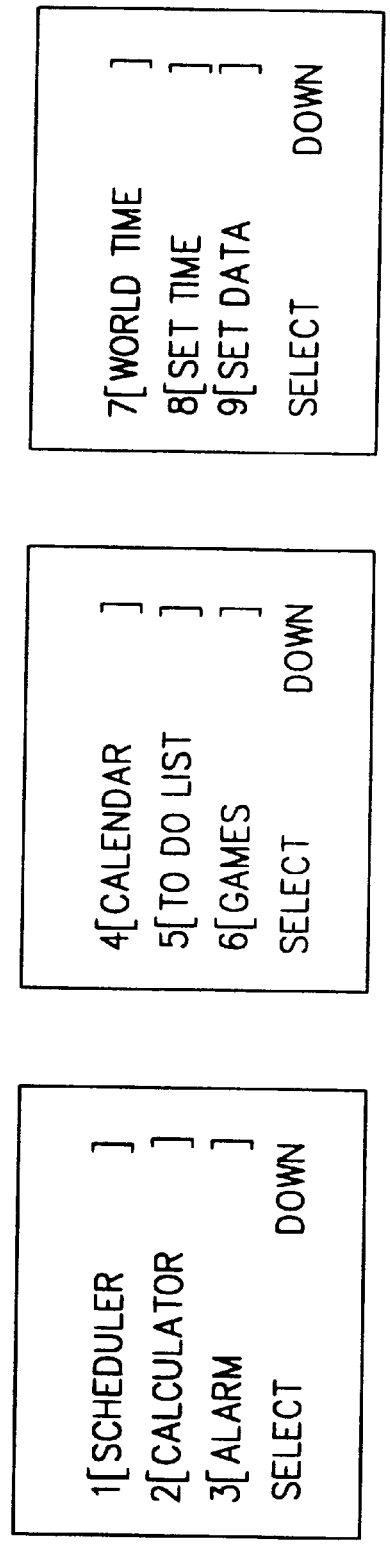

In step 217, the control unit 10 displays the corresponding sub-menu items of the selected main menu item as shown in FIG. 3B. For example, FIG. 3B shows nine sub-menu items corresponding to the main menu item No. 7 (ORGANIZER) of FIG. 3A. Then, if the user selects one of the sub-menu items in step 219, the control unit 10 proceeds to step 221, or otherwise return to step 217 to keep on displaying the sub-menu items.

Figure 3C:
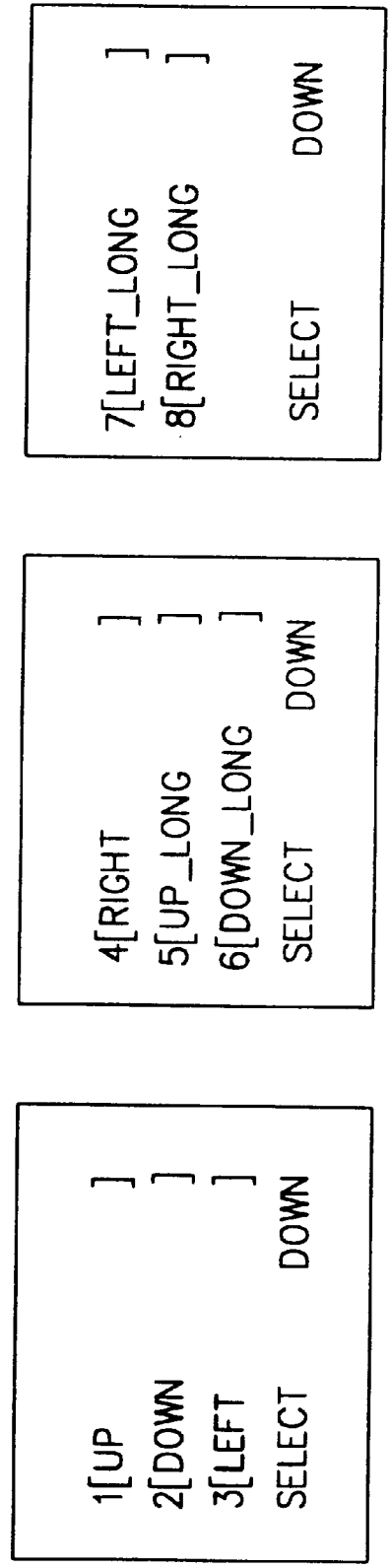
FIG. 3C illustrates the display screen of a mobile phone displaying a list of the keys used for hot key activation according to the present invention.

In step 221, the control unit displays the list of the keys used for the hot keys as shown in FIG. 3C, which shows UP key, DOWN key, LEFT key, RIGHT key, UP_LONG key (pressing of UP key prolonged), DOWN_LONG key, LEFT_LONG key, and RIGHT_LONG key. The user selects one of the keys listed as the hot key corresponding to the selected sub-menu item. Thus, if the control unit 10 detects a particular key selected at step 223, it proceeds to step 225 to assigned the selected key as the designated hot key to the selected sub-menu item, or otherwise return to step 221 to keep on displaying the key list. In this case, the key selection may be made by directly pressing a particular key or inputting the number representing it in the key list.

Then, the control unit 10 assigns the selected key to the selected sub-menu item in step 225, displaying a message notifying the completion of defining the hot key. The selected key and corresponding menu item are stored into EEPROM as data structure. Finally detecting the end key in step 229, the control unit 10 terminates the hot key-defining program, or otherwise returns to step 213 to repeat the process of defining the hot keys.

Figures 4A, 4B:
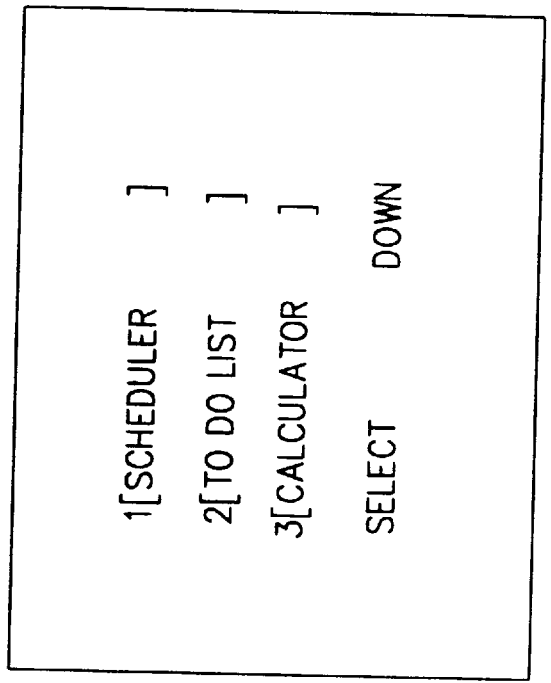
FIG. 4A illustrates the display screen of a mobile phone displaying a calendar initiated by pressing the hot key assigned to the calendar function according to the present invention.
FIG. 4B illustrates the display screen of a mobile station displaying a list of a plurality of menu items initiated by pressing the hot key assigned to the list function.

Meanwhile, a single hot key may be assigned to more than one function. While a hot key linked to one particular function is pressed to immediately execute the linked function, a hot key linked to multiple functions can be pressed to display the multiple menu items for the user to select one of them. For example, assuming that the UP key is assigned to the calendar function numbered "4" in FIG. 3B, if the user presses the UP key during the idle state, the mobile phone immediately executes the calendar function as shown in FIG. 4A. However, assuming that the DOWN key is assigned to multiple functions including the scheduler numbered "1", to-do-list numbered "5", and calculator numbered "2" of FIG. 3B, if the user presses the DOWN key during the idle state, the mobile phone displays all the menu items linked thereto as shown in FIG. 4B, so that the user may select one of them.

Thus, the user may arbitrarily define hot keys to display desired menus or initiate particular functions by a single key-stroke. While the present invention has been described in connection with specific embodiments accompanied by the attached drawings, it will be readily appreciated that various changes and modifications may be made thereto without departing the gist of the present invention.

What is claimed is:

1. A method of defining the hot keys used to immediately initiate desired functions by a user in a communication terminal, comprising the steps of:

assigning at least one key to a particular function as selected by the user, wherein the assigning step further comprising the steps of:

selecting at least one of a plurality of menu items from a display unit;

selecting at least one particular key to be used as a hot key; and assigning said selected key to said selected menu item; and making said particular function to immediately perform by pressing said assigned key.

2. The method as defined in claim 1, wherein said at selected key is able to be linked to multiple menu items.

3. The method as defined in claim 1, wherein said selected key and the corresponding selected menu item are stored into a memory means of said communication terminal.

4. The method as defined in claim 1, wherein said plurality of said menu items includes a predetermined number of functions handled by said communication terminal.

5. A method of defining the hot keys used to immediately initiate desired functions by a user in a communication terminal, comprising the steps of:

displaying a plurality of main menu items during a hot key-defining mode;

displaying a plurality of sub-menu items corresponding to one of the particular main menu item selected by the user;

activating at least one of said sub-menu items by the user;

displaying a plurality of keys used for said hot keys;

selecting one of said keys as a hot key to be assigned to said activated sub-menu; and displaying the sub-menu items corresponding to said activation.

6. The method as defined in claim 5, wherein the selected key is able to be linked to multiple menu items.

7. The method as defined in claim 5, said selected hot key is one of the navigation keys selected from a group consists of up, down, left, and right keys.

8. The method as defined in claim 5, wherein said selected hot key and the corresponding said activated sub-menu are stored into a memory means of said communication terminal.

9. The method as defined in claim 5, wherein said plurality of said menu items includes a predetermined number of functions handled by said communication terminal.

* * * * *